US009340328B2

(12) United States Patent
Sargin

(10) Patent No.: US 9,340,328 B2
(45) Date of Patent: *May 17, 2016

(54) MODIFIED MANIFOLD SYSTEM FOR FOLDING AND SEALING BAGS

(75) Inventor: Gary F. Sargin, Green Bay, WI (US)

(73) Assignee: Coating Excellence International LLC, Wrightstown, WI (US)

( * ) Notice: Subject to any disclaimer, the term of this patent is extended or adjusted under 35 U.S.C. 154(b) by 783 days.

This patent is subject to a terminal disclaimer.

(21) Appl. No.: 13/570,501

(22) Filed: Aug. 9, 2012

(65) Prior Publication Data

US 2013/0031875 A1 Feb. 7, 2013

Related U.S. Application Data

(63) Continuation-in-part of application No. 12/881,220, filed on Sep. 14, 2010, now abandoned, and a continuation-in-part of application No. 12/685,785, filed on Jan. 12, 2010, now Pat. No. 8,240,915, and a (Continued)

(51) Int. Cl.

| | |
|---|---|
| ***B65B 51/10*** | (2006.01) |
| ***B65B 7/02*** | (2006.01) |
| ***B32B 37/06*** | (2006.01) |
| ***B65D 33/22*** | (2006.01) |
| ***B31B 19/60*** | (2006.01) |

(Continued)

(52) U.S. Cl.

CPC ................ *B65D 33/22* (2013.01); *B31B 19/60* (2013.01); *B31B 19/62* (2013.01); *B65D 31/10* (2013.01); *B31B 2219/29* (2013.01); *B31B 2219/6007* (2013.01)

(58) Field of Classification Search

CPC ........ B65D 33/22; B65D 33/18; B31B 19/60; B31B 19/62; B31B 19/64; B31B 2219/29; B31B 2219/60; B31B 2219/6007; B31B 2219/6003; B29C 65/00; B29C 65/10–65/106; B29C 65/4815; B29C 65/5021; B29C 65/5027; B29C 66/91; B29C 66/91921; B29C 65/12; B29C 65/125; B65B 7/08; B65B 51/20

USPC .............. 53/479, 370.3, 370.9, 371.3, 371.7, 53/372.5, 373.3, 373.7, 373.9, 37, 4.3, 53/374.7, 375.5, 375.9, 376.5, 376.6, 53/376.7; 156/497; 493/191, 192, 203, 493/197, 133, 134, 207, 208, 189

See application file for complete search history.

(56) References Cited

U.S. PATENT DOCUMENTS

| | | | | |
|---|---|---|---|---|
| 3,347,013 A * | 10/1967 | Piazze | ............................ | 53/442 |
| 3,381,448 A * | 5/1968 | Ayres et al. | ................. | 53/370.9 |

(Continued)

*Primary Examiner* — Stephen F Gerrity
*Assistant Examiner* — Joshua Kotis
(74) *Attorney, Agent, or Firm* — Duane Morris LLP

(57) ABSTRACT

An apparatus adapted for sealing bags includes a hot air manifold along which a bag is conveyed after the bag has been filled with contents and closed. The manifold includes a hot air chamber having first air passages transmitting hot air under pressure to heat a portion of a first adhesive layer on the bag to an adhesive state, and second air passages transmitting hot air under pressure to heat a second adhesive layer on the bag to an adhesive state. A hot air deflector covers selected second air passages transmitting the hot air, wherein the apparatus is adapted for sealing woven polymeric bags with the adhesive layers. The hot air deflector is moveable to a position uncovering the selected second air passages to increase the amount of hot air, wherein the apparatus is adapted for sealing multi-wall paper bags.

13 Claims, 11 Drawing Sheets

Related U.S. Application Data continuation-in-part of application No. 12/508,710, filed on Jul. 24, 2009, now Pat. No. 8,297,840.

(60) Provisional application No. 61/180,271, filed on May 21, 2009, provisional application No. 61/139,994, filed on Dec. 22, 2008.

(51) Int. Cl.
*B31B 19/62* (2006.01)
*B65D 30/20* (2006.01)

(56) References Cited

U.S. PATENT DOCUMENTS

| | | | | |
|---|---|---|---|---|
| 3,488,244 | A * | 1/1970 | Lepisto | 156/359 |
| 3,535,987 | A * | 10/1970 | Morse et al. | 493/134 |
| 3,576,694 | A * | 4/1971 | Greisman | 156/498 |
| 3,751,876 | A * | 8/1973 | Oakley et al. | 53/376.7 |
| 3,788,917 | A * | 1/1974 | Linda | 156/82 |
| 3,910,488 | A * | 10/1975 | Goodrich | 383/85 |
| 3,953,272 | A * | 4/1976 | Webber | 156/152 |
| 4,850,944 | A * | 7/1989 | Osborn | 493/5 |
| 4,881,931 | A * | 11/1989 | Buchman | 493/192 |
| 4,976,811 | A * | 12/1990 | Siebert | 156/66 |
| 4,979,933 | A * | 12/1990 | Runge | 493/215 |
| 6,602,174 | B1 * | 8/2003 | Haverfield et al. | 493/191 |
| 8,850,778 | B2 * | 10/2014 | Jansen | 53/373.9 |
| 2002/0174626 | A1 * | 11/2002 | Lancaster et al. | 53/399 |
| 2004/0016216 | A1 * | 1/2004 | Romagnoli | 53/545 |
| 2010/0263332 | A1 * | 10/2010 | Files et al. | 53/453 |
| 2012/0227363 | A1 * | 9/2012 | Nussbaum | 53/469 |

* cited by examiner

MODIFIED MANIFOLD SYSTEM FOR FOLDING AND SEALING BAGS

CROSS REFERENCE TO RELATED APPLICATIONS

This application is a Continuation-in-Part of U.S. patent application Ser. No. 12/881,220, filed Sep. 14, 2010, which is a Continuation-in-Part of U.S. patent application Ser. No. 12/685,785, filed Jan. 12, 2010, which is a Continuation-in-Part of U.S. patent application Ser. No. 12/508,710 filed Jul. 24, 2009, which claims the benefit of U.S. Provisional Patent Application No. 61/180,271 filed May 21, 2009 and the benefit of U.S. Provisional Patent Application No. 61/139,994 filed Dec. 22, 2008, the contents of all of which are incorporated by reference herein in their entireties.

FIELD OF THE INVENTION

This invention relates to polymeric bags and non-polymeric bags, and a method and system for folding and sealing such bags.

BACKGROUND OF THE INVENTION

US 2010/0154362 A1 discloses a method and system for closing and sealing bags, wherein each bag after filling with contents is conveyed along a hot air manifold which applies hot air under pressure to heat an adhesive layer on a first panel of the bag and to heat an adhesive layer on a second panel of the bag. Each of the adhesive layers is heated to an adhesive state at a temperature below the softening point temperature of the polymeric material of the bag. Then the bag is folded to contact the adhesive layers to one another, and the adhesive layers form an adhesive-to-adhesive seal upon application of pressure. The adhesive material can transfer to the hot air manifold and associated mechanisms, causing equipment contamination. It would be desirable for the bags to have the adhesive material located in positions that will minimize transfer of adhesive material to the hot air manifold and associated mechanisms.

US 2010/0158418 A1 discloses a bag made form a polymeric woven tube. One end of the tube is closed and then sealed by being conveyed along a hot air manifold which applies hot air under pressure to heat an adhesive layer on a first panel of the tube and to heat an adhesive layer on a second panel of the tube. Each of the adhesive layers is heated to an adhesive state at a temperature below the softening point temperature of the polymeric material of the tube. Then the tube is folded to contact the adhesive layers with one another and form an adhesive-to-adhesive seal. It would be desirable to fold the tube without displacing or expelling adhesive from the fold, in order to minimize adhesive contamination on surfaces of the tube.

SUMMARY OF THE INVENTION

The invention relates to a bag to be filled with contents, the bag including a polymeric tube having a first panel, a second panel and side gussets, and the first panel having a first section and a second section. An end of the tube has a stepped construction, which includes the second section, and portions of the side gussets extending beyond the second section and a portion of the second panel extending beyond the side gussets. First adhesive material on the first section and second adhesive material on the stepped construction attain adhesive states by heating to a temperature below the softening point temperature of the polymeric material. The tube has a third section between the first section and the second section. The first adhesive material and the second adhesive material are absent from the third section wherein the third section is free of adhesive. The end of the tube is closed. The tube is folded along the third section without displacing or expelling adhesive from the third section in order to minimize adhesive contamination on surfaces of the tube, and the adhesive material on the stepped construction and the adhesive material on the first section meet in contact and under pressure below the third section and provide an adhesive-to-adhesive seal at the end of the bag.

Another embodiment of the invention relates to a bag constructed of polymeric material and adapted to be closed and sealed after being filled with contents. The bag includes a first panel, a second panel and side gussets, the first panel having a first section and a second section. The bag has one closed end. An end of the bag through which the bag is to be filled with contents has a stepped construction, which includes the second section, portions of the side gussets extending beyond the second section and a portion of the second panel extending beyond the portions of the side gussets. First adhesive material on the first section and second adhesive material on the stepped construction attain adhesive states by heating to a temperature below the softening point temperature of the polymeric material. The first panel has a third section between the first section and the second section. The first adhesive material and the second adhesive material are absent from the third section, wherein the third section is free of adhesive. The end of the bag is closable and the bag is foldable along the third section without displacing or expelling adhesive from the third section in order to minimize adhesive contamination on surfaces of the tube, and the adhesive material on the stepped construction and the adhesive material on the first section meet in contact and under pressure below the third section and provide an adhesive-to-adhesive seal at the end of the bag.

Another embodiment of the invention relates to a method for closing and sealing an end of a bag taken from multiple bags each made of polymeric material. The bag has a first adhesive material on a first section of a first panel, and has a second adhesive material on a stepped construction, which includes a second section of the first panel, portions of side gussets extending beyond the first panel and a portion of a second panel extending beyond the side gussets. Further, the method includes, heating the first adhesive material and the second adhesive material to their adhesive states, while conveying the bag along a hot air manifold after the bag has been filled with contents, and the bag closed and creased. The first adhesive material and the second adhesive material are absent from a third section of the first panel, wherein the third section is free of adhesive. The method includes conveying the third section free of adhesive along a section of the hot air manifold, which minimizes adhesive contamination. Further, the method includes folding the bag along the third section without displacing or expelling adhesive from the third section, which minimizes adhesive contamination of surfaces of the tube, and applying pressure to contact the first adhesive material and the second adhesive material and form an adhesive-to adhesive seal, which seals the end of the bag through which the bag has been filled with contents.

BRIEF DESCRIPTION OF THE DRAWINGS

Embodiments of the invention will now be described by way of example with reference to the accompanying drawings.

DETAILED DESCRIPTION OF THE INVENTION

Figure 1:
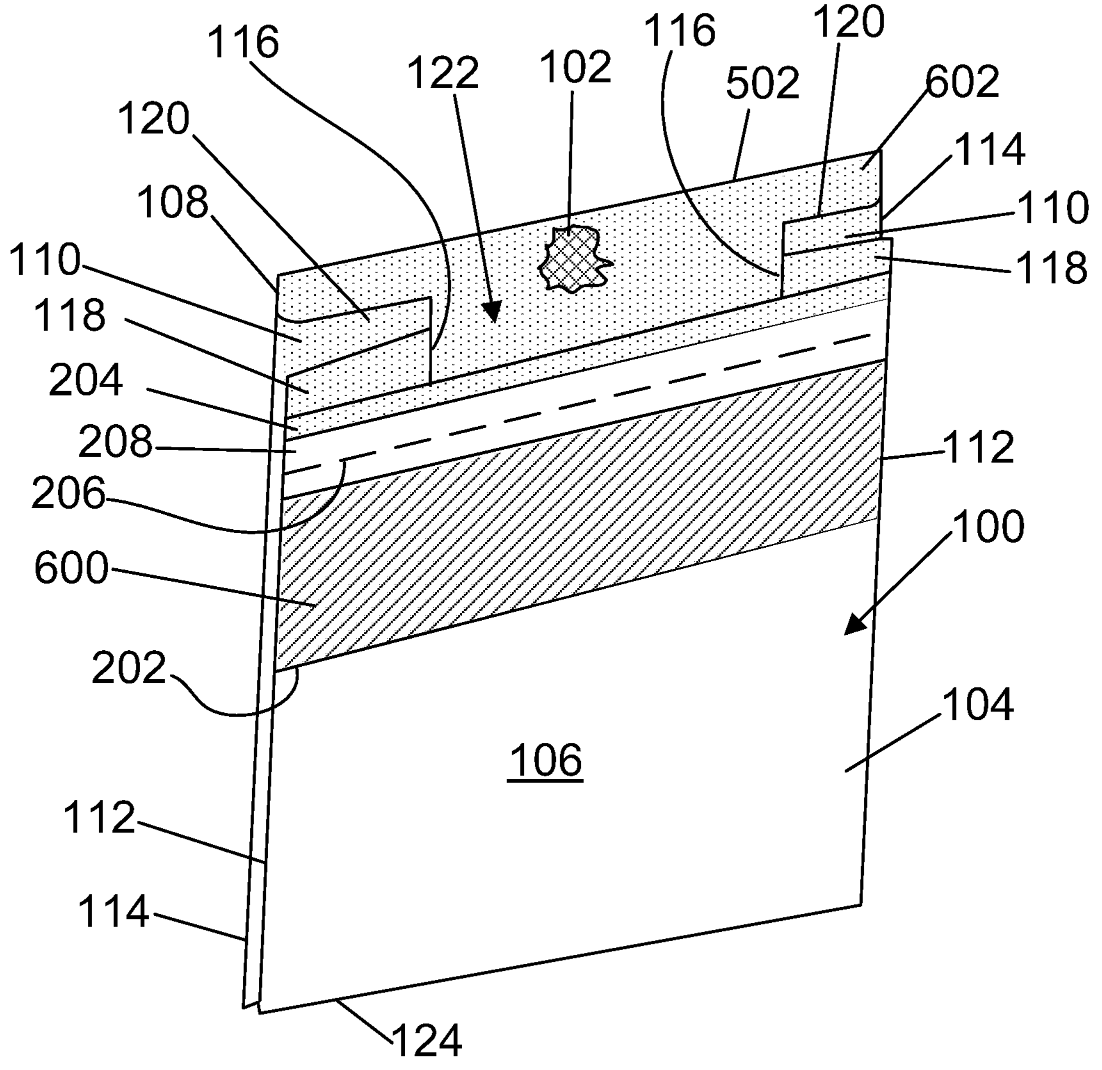
FIG. 1 is an isometric view of an embodiment of a tube of polymeric material to be made into a bag.

Bags to be used for bulk packaging of granular or finely ground materials, such as nutrients including, but not limited to, whole and ground grains, seeds, dry pet food, chemical fertilizers, other bulk food and non-food products, and growing plant treatments, must be durable to resist material degradation, abrasion, puncture, contamination and leakage of contents, and must withstand a drop test while sealed and filled with contents weighing up to about 50 pounds, and even up to about 80 pounds. Moreover, such bags are typically disposed of after use, which requires an inexpensive and light-weight construction that is environmentally friendly, may be recyclable, and reduces waste in the supply chain from production, use of the bag, to disposal in either a recycling stream or landfill.

Currently, multi-walled paper and polymer layer bags, consisting of multiple paper layers and layers of polymer film, are heavy, expensive to produce and ship, easy to tear and puncture, and create waste in the supply chain. Multi-wall paper/polymer layer bags, traditionally used to package bulk products, are not recyclable and add significant amounts of materials to landfills. This invention overcomes many of the significant drawbacks of multi-wall paper/polymer layer bags, by offering a lighter weight bag that is less expensive, more durable and tear-resistant, resulting in significantly reduced waste in the supply chain, and is 100% recyclable in a suitable recycling stream. Moreover, this invention can function essentially in the same way on existing bag filling and sealing equipment to perfect a pinch-sealed bag filled with product.

A typical manufacturing production line provides apparatus to fill the bags with contents, and further provides apparatus to close the bag in a simple manner by pinch closing, and further provides equipment to seal the pinch closed bag. Bags of traditional construction can be close by sewing or alternatively, sealed with a hot melt sealant instead of sewing. Such bags of traditional construction include multi-wall bags fabricated of paper and polymeric film laminates. The bag construction must allow quick filling of the bag with contents and thereafter must allow closing and sealing the bag.

The traditional bag construction has layers of polymer laminated with a paper layer or layers. Sealing of the traditional bags after filling is accomplished by re-melting a hot melt adhesive and/or meltable polymer layer at an elevated temperature while the paper resists damage to the bag construction. The high flash point inherent to paper is relied upon to withstand the application of heat at an elevated temperature and thereby to protect the bag from damage due to the heat and temperature. Further, a thin polyethylene, PE, polymer coating on the paper surface can melt or soften together with the hot melt adhesive to adhere to the paper and form a secure seal. Existing end-user production line equipment applies hot air onto the bag to melt and activate the hot melt adhesive and/or meltable polymer layer, following the bag filling operation. The heat must be applied at a temperature that melts the hot melt adhesive, and further, to at least partially melt the polymer coating on the paper surface, while relying on the paper to withstand the heat and temperature, and to prevent bag weakening or burning due the heat and temperature. However, a major drawback of the multi-wall paper and polymer laminates is that they are composite materials not capable of recycling as either paper or plastic as a single material classification. Further, the multi-wall laminates of the traditional bag are not compostable, and consequently remain in one piece in landfills. Further, the multi-wall laminates are heavy, and add unnecessary shipping costs.

In an end-user's manufacturing production line, apparatus is provided to fill the bags with contents through an open end of the bag, followed by closing and sealing the filled bag. Traditional production lines have employed stitching equipment to sew the bags shut. Alternative production lines have heated air jets to apply heat at an elevated temperature to melt and activate pre-applied hot melt adhesives that have been pre-applied to traditional bags of thick multiwall paper and polymer film laminate construction. Thereafter, a closure mechanism closes the bags in an advantageous manner simply by pinch closing the open ends. The closure mechanism applies pressure on the bags to close and hold the bags closed while the hot melt adhesive adheres to the closed bag and until the adhesive cools and hardens.

The heat must be applied at a temperature that melts the hot melt adhesive, and further, which can melt portions of the polymer coating on the paper surface, while relying on the paper to withstand the heat and temperature, and prevent weakening or burning due the heat and temperature. The traditional bags have a construction of thick multi-wall paper and polymer film laminates. The one or more, thick paper layers of the traditional bags withstand the heat applied at elevated temperatures without weakening the bag strength and without burning the paper. Further, a laminated film coating of polyethylene, PE, on the paper surface partially melts while in contact with the melted, hot melt adhesive to form a heat seal with the adhesive.

The embodiments of the invention provide a sustainable solution to the long existing need for bags that replace traditional bags of multi-wall paper and polymer laminates, and yet can withstand the application of heat and temperature to seal the bags, which continue to be prevalent in existing production equipment.

Accordingly, there has been a long existing need for a bag fabricated of structural components capable of being recycled or resulting in less landfill material compared to traditional bags, and capable of being sealed by existing production equipment to avoid expensive replacement of existing production line equipment. Accordingly, to replace the existing structural components of a laminated paper and polymer bag with an improved bag, the improved bag must be heat sealed by existing production equipment while withstanding the application of heat and/or pressure to melt the adhesive and seal the bag. Moreover, there has been a long existing need to eliminate a paper and polymer laminate as one of the structural components of the bag, which is incapable of recycling and/or degradation in a land fill, and which add significantly higher weight and quantities of materials in a landfill.

Traditional multi-wall paper and polymer laminate bags each have about 275 grams of paper and 50 grams of polypropylene polymer, and a carbon footprint of about 11 as a measure of carbon emissions. Lighter weight bags of about 150 grams results from embodiments of the invention with fewer raw materials than those used in making the traditional bags, and result in a substantially reduced carbon footprint of about 5.

According to embodiments of the invention, woven bags are fabricated entirely of a recyclable polypropylene, and with structural components including a tubular woven (mesh) bag laminated inside of a non-porous polymeric film of a single layer or of laminated layers. The bags are fabricated entirely of a recyclable polypropylene material that is recyclable and may be compostable due to having resin additives such as metallocene, and further that is free of recycled or contaminated polymers of unknown chemistry and unknown material mixtures. Moreover, the bags according to embodiments of the invention are less heavy and are more resistant to abrasion, tearing and puncture, and are reusable compared with traditional multi-wall paper and polymer laminates that are susceptible to abrasion and damage. The bags according to embodiments of the invention reduce waste due to shipping costs, damaged bag contents and increased shelf life of the contents.

The embodiments of the invention fulfill a long existing need for lighter weight, strong bags having structural components that eliminate traditional non-recyclable paper-polymer laminates, and moreover, that are durable for reuse, and are degradable by composting in a landfill and are recyclable as a single material. Moreover, the recyclable and/or compostable bags include water soluble adhesive materials as structural components of the bags. Embodiments of the adhesive materials can be pre-applied while soluble in water, a nontoxic solvent. The adhesive materials are applied onto opposed surfaces of the bags, followed by curing by exposure to radiant or entrained heat, electron beam, EB, radiation, air or other curing medium and/or to evaporate the nontoxic dispersion for environmentally safe removal from the activatable adhesive components of the dispersion mixture that attain a non-adhesive hardened state, which is non-reactive to water or humidity, and is nontoxic by incidental contact with nutrients being filled in the bags. An opposite end of each of the bags has a pinch bottom or alternatively, a flat bottom configuration that is closed and sealed by sewing, or by an adhesive preferably a nontoxic adhesive or by plastic welding or by a material including, but not limited to polymeric, paper or nonwoven tape. The bags are folded flat for shipment to another manufacturing facility where the bags are filled with contents and closed and sealed.

The adhesive materials to seal the bag are activatable to a melted adhesive state using existing production line equipment that apply heat at a temperature sufficiently below the softening point temperature Tg of the polymeric structural components of the bag, and to melt the adhesive materials to an adhesive state without damaging the other structural components of the bag.

While a traditional multi-wall paper/polymer layer bag can be sealed with a re-melted hot melt adhesive, these hot melt adhesives are not suitable for sealing polymeric bags, which typically are comprised of one or more polymeric layers of recyclable polypropylene, or a recyclable and/or compostable polypropylene woven bag and an outer polymeric layer or laminate of two or more polymeric layers of recyclable polypropylene or other polymer material, but not including either paper or an outer layer, which is not heat-sealable on traditional bag manufacturing production equipment. The heat required to activate a hot melt adhesive to an adhesive state would be detrimental to a polymer woven bag and would destroy the structural integrity of the bag. A traditional multi-wall paper/polymer layer bag can be sealed with a hot melt adhesive, whereas on a polymeric bag the heat applied by existing end-user equipment to reactivate or re-melt a hot melt adhesive would further heat the polymer material of the bag above its softening point Tg temperature causing the polymer material to soften, lose tensile strength or even undergo plastic deformation. Accordingly, typical known hot melt adhesives are not suitable for forming a seal on a polymeric bag.

The hot melt adhesive is reactivated by a stream of hot air coming from a hot air sealer equipment. The equipment is designed to blow hot air only on the 1.5 inch width of pre-applied adhesive to render the adhesive to a heat activated adhesive state. Typical heat settings on a hot air sealer equipment for multi-wall paper bags often exceed 204.44° C. (400° F.). However, woven polypropylene bags will deform at approximately 148.89° C. (300° F.). A need exists to modify the equipment to seal woven polymeric bags at a reduced heat activation temperature. During the development of a pinch bottom closure for woven polymeric bags, it became clear that hot air sealer equipment that typically seal multi-wall paper bags needed to be modified.

Figure 2:
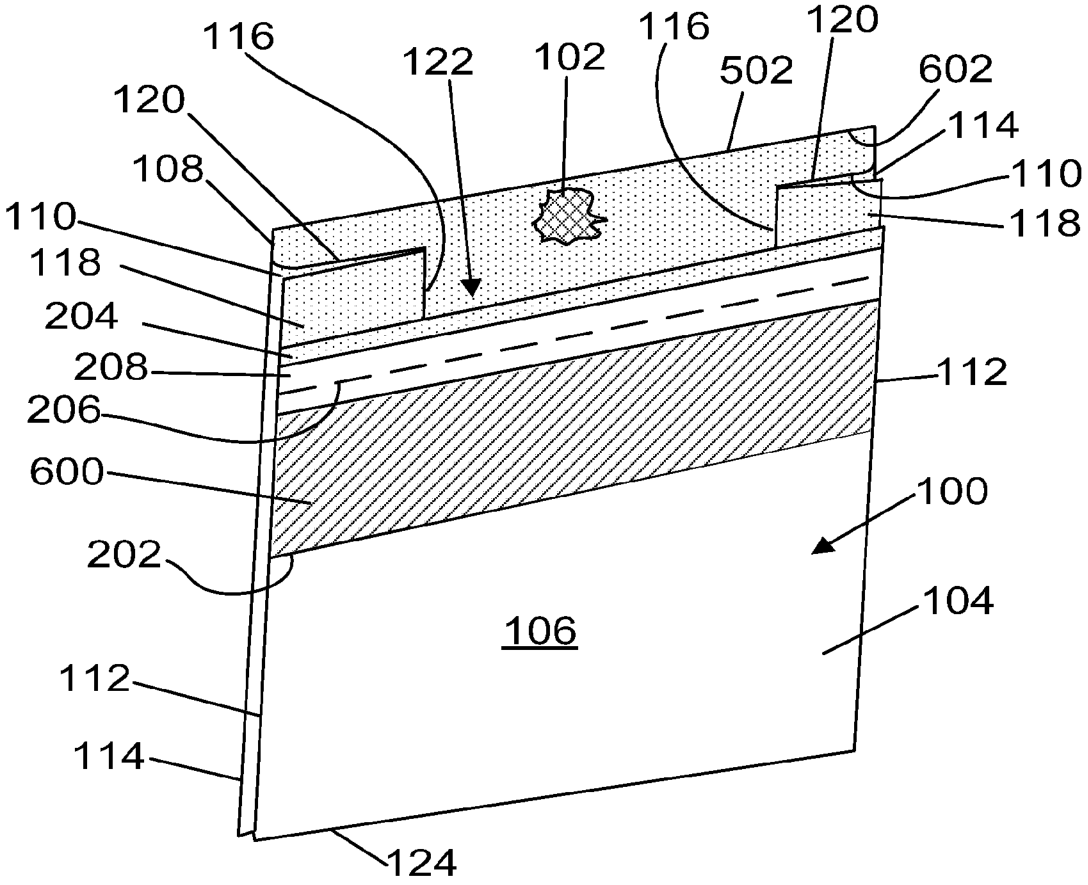
FIG. 2 is an isometric view of another embodiment of a tube of polymeric material to be made into a bag.

Each of FIGS. 1 and 2 discloses an alternative embodiment of a bag 100 formed from a polymeric tube, which includes an outer layer 104 having a single polymeric film or a laminate of polymeric films, and an inner polymeric woven bag layer 102. The tube is formed with first panel 106, a second panel 108 and an open end 122 of the bag that is pinch closed by closing the first panel 106 and the second panel 108 against each other at their end edges adjacent the open end 122. A portion of the woven bag layer 102 is depicted with a woven appearance.

The polymeric woven bag 100 has a stepped, or step cut, construction at the open end 122, wherein a portion of the first panel 106 is removed by severing, cutting or hot knife, and wherein the first panel 106 is made shorter than a longer portion 502 of the second panel 108 at the open end. The longer portion 502 provides a foldable flap portion 502 on the second panel 108. Further, the inner woven layer 102 of the foldable flap portion 502 is exposed. The first panel 106 and the second panel 108 are joined along their side edges along sides 110 of the bag 100.

Further, in FIGS. 1 and 2, the bag 100 has sides 110 in the form of side gussets 110. Longitudinal end folds or creases 112 join the side gussets 110 with the first panel 106. Longitudinal end folds or creases 114 join the side gussets 110 with the second panel 108. Longitudinal folds or creases 116 are between foldable first portions 118 and foldable second portions 120 of respective side gussets 110. The panels 106, 108 are joined along their side edges and end edges by plastic welding of the edges or by an adhesive. Alternatively the bag 100 is tubular, and the panels 106, 108 are defined by making folds or creases in the bag 100. The stepped, or step cut, construction exposes respective side gussets 110, wherein each of the side gussets 110 includes a first gusset portion 118 joining the first panel 106 and a second gusset portion 120 joining the second panel 108.

In FIG. 1, the first gusset portion 118 and the second gusset portion 120 extend at different lengths beyond a panel second section 204. The first gusset portion 118 extends beyond the second section 204. The second gusset portion 120 extends beyond the first gusset portion 118. In FIG. 2, the first gusset portion 118 and the second gusset portion 120 extend the same length beyond a panel second section 204.

In FIGS. 1 and 2, a structural component of the first panel 106 includes a first adhesive layer 600 applied on the first section 202 of the first panel 106. A structural component of the second panel 108 includes a second or further adhesive layer 602 on a portion of the second panel 108. Further, the second adhesive layer 602 is on the second section 204 of the first panel 106, and on the exposed portions 118, 120 of the side gussets 110 exposed by the stepped or step cut construction. The adhesive layers 600, 602 are dried to a non-adhesive stable state by passage through a heated oven or directing fan blown heated air onto the adhesive layers. According to an embodiment of the invention, the adhesive layer 600 and the adhesive layer 602 are applied simultaneously. According to another embodiment of the invention, the adhesive layer 600 and the further adhesive layer 602 can be of the same material applied simultaneously on the bag 100 or, alternatively, applied separately.

An end 122 of the bag is open through which contents can be introduced into the bag 100. After filling the bag with contents, the end 122 is adapted to be pinch closed between end edges of the first panel 106 and the second panel 108. An opposite end 124 of the bag 100 is closed by being sewn, taped, glued or plastic welded. Advantageously, the bag 100 is fabricated entirely of compostable polypropylene, PP.

The bag 100 is foldable along a fold line 206 extending across the bag 100, wherein the fold line 206 extends across the first panel 106 between a panel first section 202 adjacent to a panel second section 204. The bag 100 is foldable without creasing, or alternatively is foldable along a crease formed along the fold line 206 by a creasing apparatus.

Figure 3:
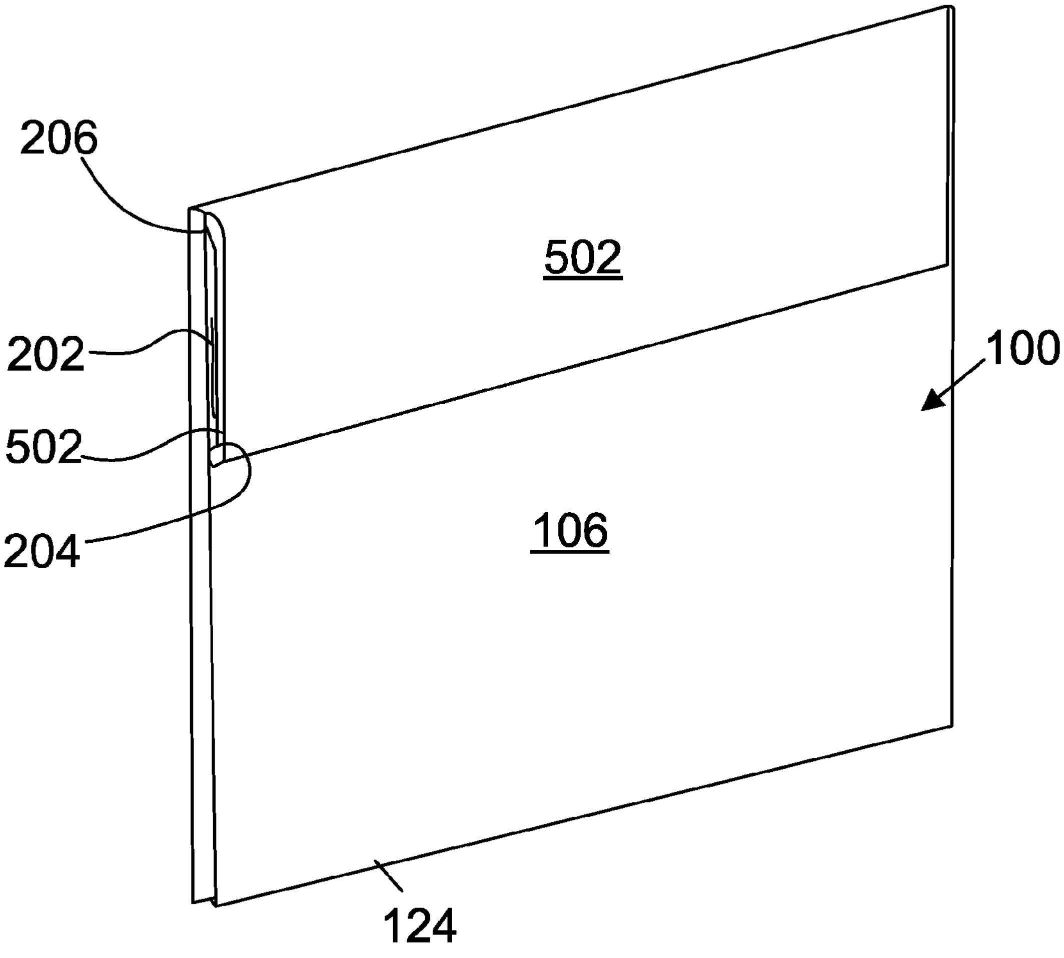
FIG. 3 is an isometric view of a bag made from a tube of either FIG. 1 or FIG. 2.

An adhesive-to-adhesive seal is formed by applying heat to activate the adhesive layers 600, 602 (FIG. 3) to adhesive states, which attain adhesive states by heating to a temperature below the softening point temperature of the polymeric material. In FIG. 3, the bag 100 is foldable along the fold line 206 to fold the first panel 106 on itself and to urge the adhesive layer 602 into contact with the adhesive layer 600 below the fold line 206 and form an adhesive-to-adhesive seal. The sealing flap portion 502 is folded onto the panel second section 204 of the panel 106 to hold the bag 100 in a folded configuration. Preferably, the adhesive layers 600, 602 are the same width, or the same height relative to the height of the bag, to form an adhesive-to-adhesive seal of the same width.

Another embodiment of the bag 100 has the end 122 closed and sealed, as disclosed by FIG. 3, to form a bottom of a bag 100, while the opposite end 124 is an open end through which the bag is to be filled with contents. The bag 100 is made from a polymeric tube, wherein the opposite end 124 is an open end of the polymeric tube. The opposite end 124 has the same construction as one embodiment of the end 122, previously described, such that the opposite end 124 can be closed and sealed after filling the bag with contents.

Then, the embodiments of the bag 100 are prepared for storage and shipment. The end 122 of the bag 100 is pinch closed by closing the first panel 106 and the second panel 108 against each other at their end edges adjacent the open end 122. The end 122 of the bag 100 is folded flat while remaining unsealed, and the bag 100 is folded flat for storage and shipment to another manufacturing facility wherein the end 122 of the bag 100 is opened, the bag 100 is unfolded and expanded from the flat configuration, and the bag is filled with contents. Then, the end 122 is closed and sealed. Each of the adhesive layers is heated to an adhesive state at a temperature below the softening point temperature of the polymeric material of the bag. Then the bag is folded to contact the adhesive layers to one another, and the adhesive layers form an adhesive-to-adhesive seal upon application of pressure. It would be desirable to fold the tube without displacing or expelling adhesive from the fold, in order to minimize adhesive contamination on surfaces of the tube. Thus, the first panel 106 of the polymeric tube has a third section 208 between the first section 202 and the second section 204. The tube is folded along the third section 208, wherein the adhesive material 602 on the stepped construction and the adhesive material 600 on the first section 106 meet in contact and under pressure below the third section 208 and provide an adhesive-to-adhesive seal at one closed end of the bag 100.

The first adhesive material 600 and the second adhesive material 602 are absent from the third section 208, wherein the third section 208 between the first section 202 and the second section 204 is free of adhesive. As a result, the tube is folded and pressure is applied, without displacing or expelling adhesive from the third section 208, in order to minimize adhesive contamination on surfaces of the tube.

Development of a pinch bottom closure on woven polymeric (polypropylene) bags discovered that the polypropylene materials that the bag is constructed of could not withstand the heat required to re-activate a hot melt via typical hot air sealers. Theoretically, hot melts could be used but would need much longer sealing equipment in order to 1) run at much lower air temperatures, and 2) allow the bag more time to seal under the reduced heat.

Figure 1A:
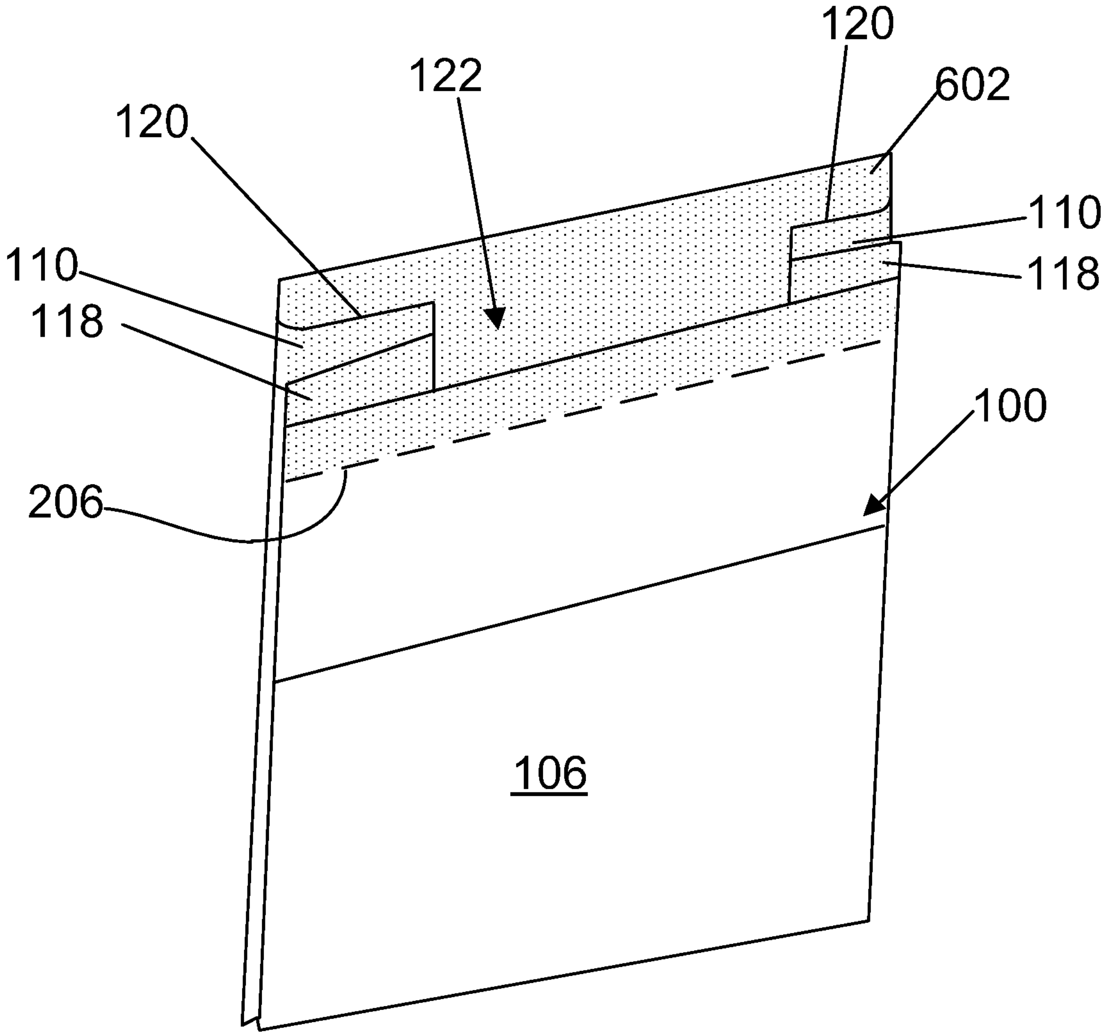
FIG. 1A is an isometric view of an embodiment of a paper bag having adhesive material above a fold line of the paper bag.

To seal a multi-wall paper bag 100, FIG. 1A, its flap portion or sealing flap 122 is coated with a 3.81 cm. (1.5 inches) width of hot melt adhesive 602. After filling the bag with contents, the adhesive 602 is heated to an adhesive state and the sealing flap 122 is folded to adhere the adhesive 602 against an adjacent 3.81 cm. (1.5 inches) width of the bag. A typical hot air sealer equipment (apparatus) heats the hot melt adhesive to its melt temperature, while the paper materials of the bag withstand the hot melt temperature without heat damage. A pinch closure of the sealer equipment folds the sealing flap and pinches the bag to seal the sealing flap against the bag while the adhesive cures and dries. However, a typical hot air sealer equipment produces hot melt temperatures that would cause heat damage to woven polymeric (polypropylene) bags disclosed herein.

An embodiment of the invention provides a woven polymeric (polypropylene) bag 100 with a pinch closure without requiring new capital equipment for sealing the bags. The adhesives 600, 602 disclosed herein for sealing woven polymeric (polypropylene) bags 100 will reactivate to an adhesive state at much lower temperatures than higher melt temperatures required to melt a hot melt adhesive, and will do so within the current dwell times provided by today's typical hot air sealer equipment. A problem was that the lower melt temperature adhesives disclosed herein provide an adhesive-to-adhesive seal while the sealing flap 502 is folded against the panel section 204. The adhesive-to-adhesive seal requires adhesive coatings 600, 602 over a wide area across the polymeric bags 100. More specifically, a full 7.62 cm. (3 inches) width of adhesive coatings 600, 602 is needed, which provides a problem for the typical hot air sealer equipment. The typical hot air sealer equipment is capable of heating a 3.81 cm. (1.5 inches) width of hot melt adhesive on a sealing flap of a multi-wall paper bag. However, hot air distribution is needed over a 7.62 cm. (3 inches) wide area across the woven polymeric bag 100. For this reason, the hot air sealer equipment is modified with an air manifold to distribute hot air to where it is needed over a 7.62 cm. (3 inches) wide area across the woven polymeric bag 100. This modification provides a capability of the same hot air sealer equipment to seal both multi-wall paper bags and woven polymeric bags 100 on the same equipment.

The modification is capable of heating adhesive material having a dimension up to 3.81 cm (1.5 inches) in width on the first section of the first panel, and heating the adhesive material to its adhesive state while having a dimension up to 3.81 cm (1.5 inches) in width on the stepped construction of the bag.

Figure 4:
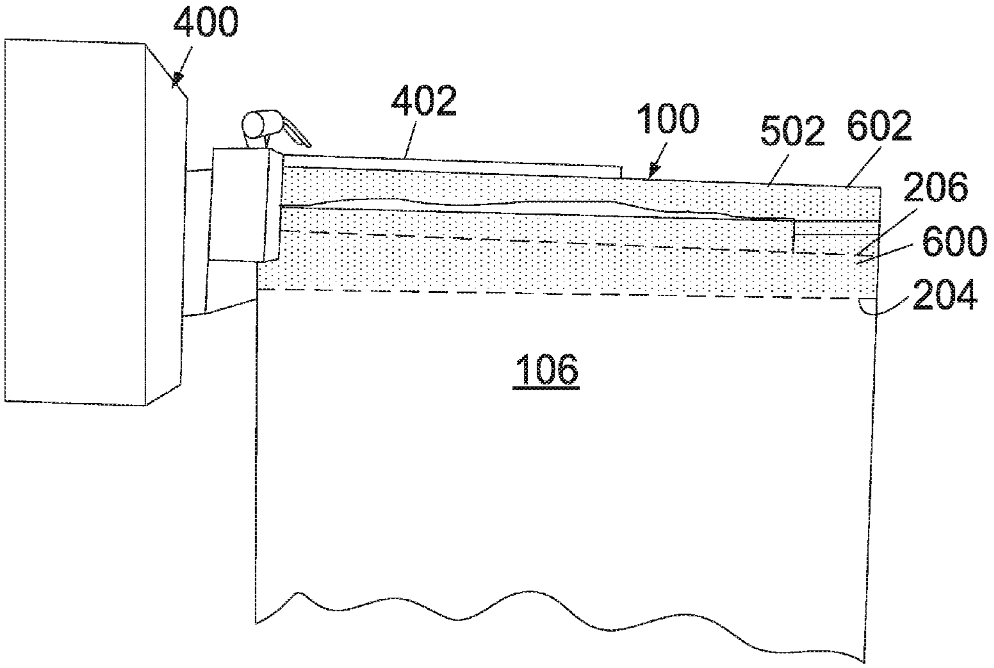
FIG. 4 is a schematic view of a portion of a hot air sealer apparatus and a woven polymeric bag conveyed from right to left as viewed in the Figure.

FIG. 4 discloses a system performing a method for closing and sealing an end of bag taken from multiple bags each made of polymeric material. FIG. 4 discloses a portion of a pinch sealing unit 400 or hot air sealer apparatus 400 and a woven polymeric bag 100 conveyed from right to left as viewed in the Figure. The apparatus 400 has a stationary guide plate 402 against which the bag 100 is supported. The stationary guide plate 402 has a vertical orientation.

Figure 5:
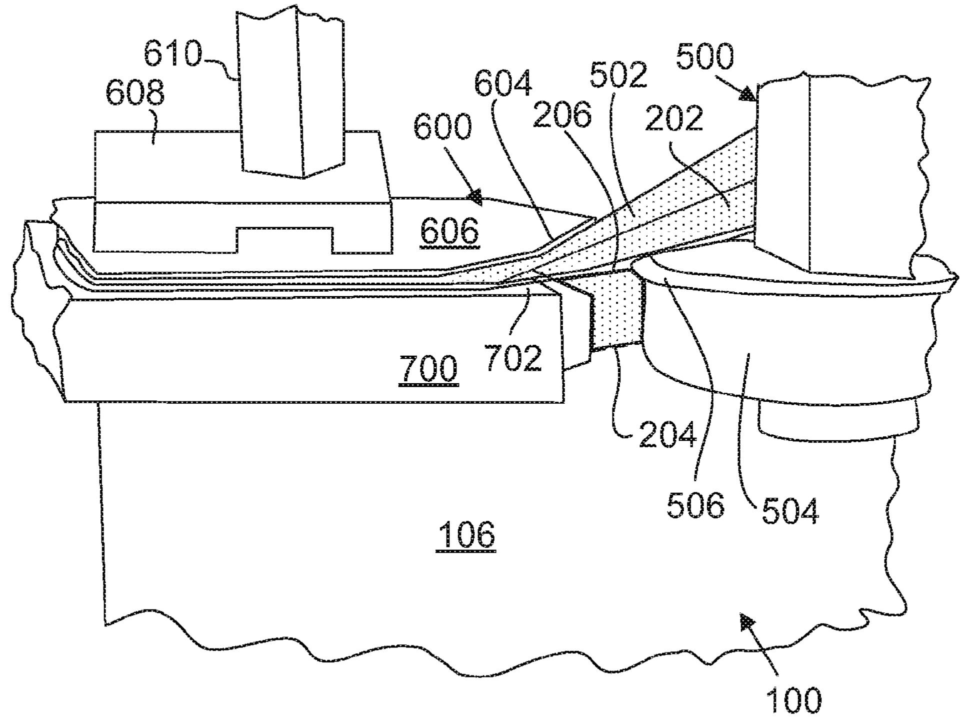
FIG. 5 is a schematic view of a creasing apparatus of the hot air sealer apparatus of FIG. 4. Further, FIG. 5 discloses a folding section of the hot air sealer apparatus of FIG. 4.

FIG. 5 discloses a creasing apparatus 500 of the hot air sealer apparatus 400. The bag 100 is conveyed past a rotatable creasing wheel 504. A circumference of the creasing wheel 504 rolls over the bag 100 to pinch close the bag end 122 while the bag end 122 is conveyed between the creasing wheel 504 and the guide plate 402, FIG. 4. The creasing wheel 504 has a projecting circumferential rim flange 506 to press against the fold line 206, disclosed by FIG. 3, of the bag 100, and to crease the bag 100 along its fold line 206. The creased bag 100 folds along the fold line 206, which pivots the flap portion 502 and the section 202 of the panel 106 along the fold line 206.

In FIG. 5, after passing the creasing wheel, the stepped construction of the bag 100 enters a folding apparatus 600 of the hot air sealer apparatus 400. The stepped construction of the bag 100 first passes under a diagonal flared leading edge 604 of a folding blade 606. The folding blade 606 is formed lengthwise along a bent stationary blade, such that the bent stationary blade extends behind the stepped construction of the flap portion 502 and the section 202 of the panel 106. The flared leading edge 604 guides the stepped construction of the flap portion 502 and the section 202 of the panel 106 under the folding blade 606. With reference to 6, the stepped construction of flap portion 502 and the section 202 of the panel 106 continues to pass under and against the folding blade 606. The folding blade 606 extends lengthwise rearward of its flared leading edge 604 and bends downward progressively of its length until it is parallel to a top wall 702, disclosed by FIG. 6, of a hot air manifold 700.

Figure 7:
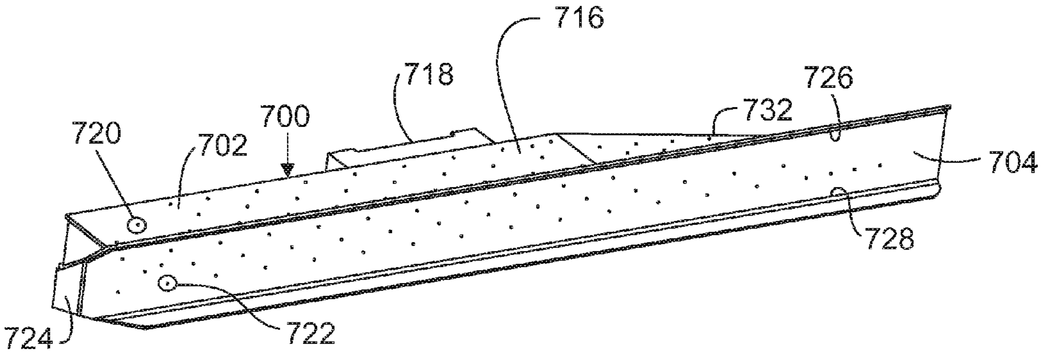
FIG. 7 is an isometric view of a hot air manifold to be incorporated in the folding section of FIG. 5.

The adhesive layer 602 is heated to an adhesive state by hot air blown through a top wall 702 of a hot air manifold 700, disclosed by FIG. 7. The adhesive layer 600 is heated by hot air blown through a back wall 704 of the hot air chamber 716. For example, the adhesive layer 602 on the flap portion 502 and the section 202 of the panel 106 of the bag 100 is approximately 3.81 cm. (1.5 inches) in width and extends across the bag 100. Similarly, the adhesive layer 602 is approximately 3.81 cm. (1.5 inches) in width and extends across the bag 100.

Figure 8:
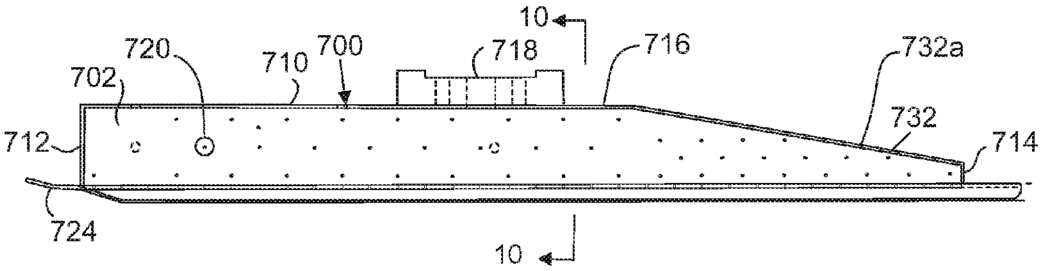
FIG. 8 is a top plan view of the a hot air manifold of FIG. 7.
Figure 9:
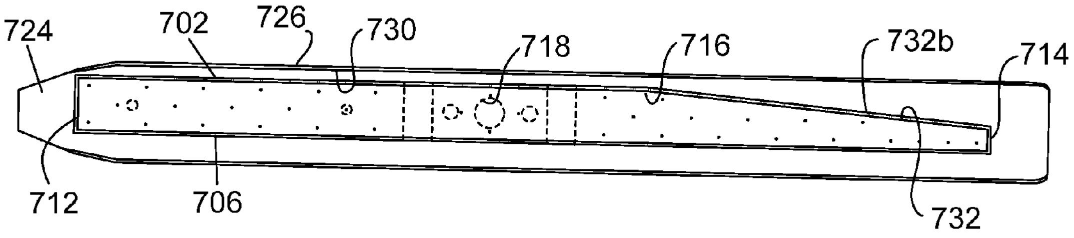
FIG. 9 is a view of a back wall of the a hot air manifold of FIG. 7.
Figure 10:
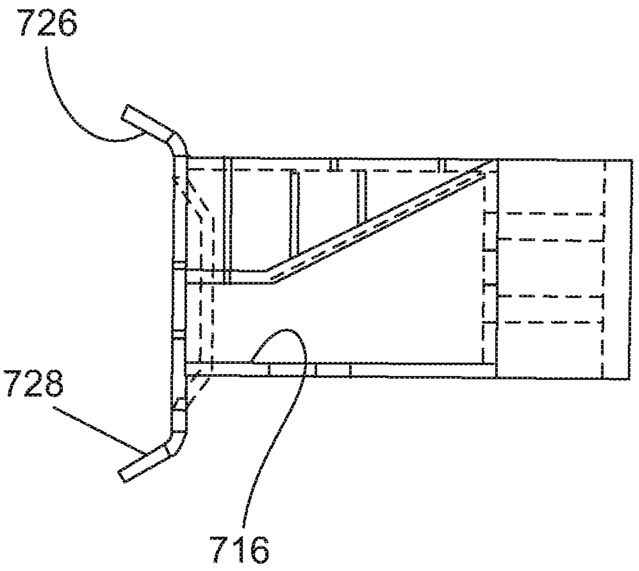
FIG. 10 is a cross section along the line 10-10 of FIG. 8.

FIG. 7 discloses the hot air manifold 700 of the hot air sealer apparatus 400 having a hollow hot air chamber 716, disclosed by FIGS. 8, 9 and 10. The hot air chamber 716 is provided by the top wall 702, the back wall 704, a bottom wall 706 in FIG. 9, a front wall 710 in FIG. 8 and end walls 712, 714, for example, made by stamping and forming individual pieces and welding or brazing the pieces together to form the hot air chamber 716. An inlet 718 to the hot air chamber 716 is provided through the front wall 710. Hot air under pressure is supplied through the inlet 718 to pressurize the hollow chamber 716.

FIGS. 7 and 8 disclose the top wall 702 is perforated with a distribution of air passages 720 blowing hot air onto the adhesive layer 602 on the flap portion 502 and on the adhesive layer 600 on the section 202 of the panel 106. The back wall 704 is perforated with a distribution of air passages 722 blowing hot air onto the adhesive layer 600 on the panel section 204 of the bag 100. The back wall 704 has a flared leading edge 724 to guide the panel section 204 past the leading edge 724.

Figure 8A:
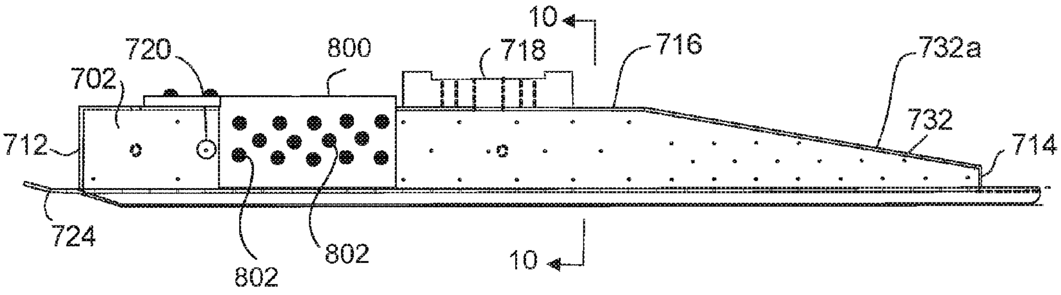
FIG. 8A is a top plan view of a modified hot air manifold and a hot air deflector.
Figure 8B:
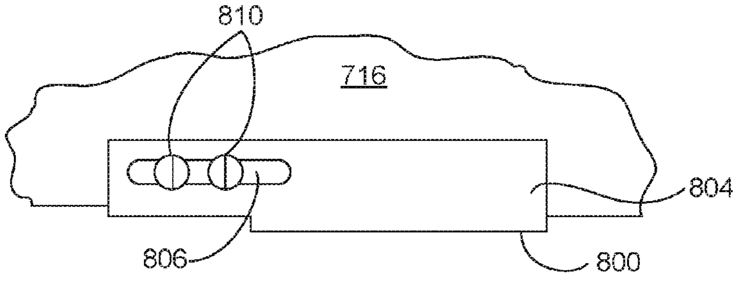
FIG. 8B is a fragmentary view of a portion of the structure in FIG. 8A.

FIG. 8A discloses a further modification. Because woven polymeric bags cannot withstand as much heat as a multiwall paper bag, and further, because an adhesive activated at a relatively lower temperature is required for use on woven polymeric bags, a selected some of the passages 720 in the top wall 702 can be covered to reduce the number of air passages 720, which transmit hot air under pressure through the top wall 702 for heat activating a second adhesive layer 602 on a woven polymeric bag, for example, a bag of FIG. 1 or 2. In FIG. 8A, on the top wall 702 of the hot air chamber, the manifold has a hot air deflector in the form of a slidable plate 800 with multiple openings 802 through the slidable plate 800. The plate 800 is slidable to a position on the top wall 702 wherein some of the passages 702 are misaligned with respective openings 802 of the plate, and instead are covered by the plate 800. By covering some of the passages 702, the number of air passages 720 are reduced, which reduces the amount of hot air under pressure through the top wall 702 for heat activating a second adhesive layer 602 on a woven polymeric bag. The reduced hot air provides a corresponding reduced lower temperature sufficient to heat the adhesive layer 602 to an adhesive state on a woven polymeric bag of FIG. 1 or 2, and avoid weakening or melting of the polymeric material of the bag. The plate 800 is slidable to another position on the top wall 702, wherein the openings 802 align with respective air passages 720, such the air passages 720 are uncovered to transmit hot air. The number of passages 720 is increased, which transmit an increased hot air flow. applied to the adhesive layer 602 for heating to an adhesive state. Thereby, the increased hot air flow is sufficiently high to heat the adhesive layer 602 on a multiwall paper bag 100, FIG. 1A. Thus, the apparatus is adapted to seal a multiwall paper bag. In FIG. 8B, the slidable plate 800 has an integral flange 804 extending over the back wall 716 of the manifold. The flange 804 has an elongated slot 806 through which a pair of adjustment screws 810 extend and attach to the back wall 716. While the adjustment screws 810 are threadably loosened, the elongated slot 806 slidably moves relative to the screws 810 as the plate 800 is slidably moved into a desired position. The screws 810 are threadably tightened to bear against the flange 804 and retain the plate 800 stationary in the desired position.

Figure 6:
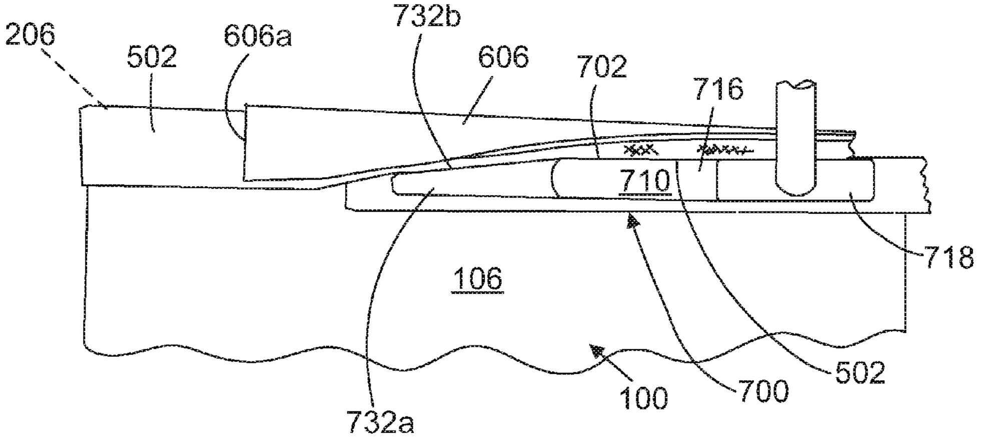
FIG. 6 is a schematic view of the hot air manifold of FIG. 7 in the folding section of FIG. 5.
Figure 11:
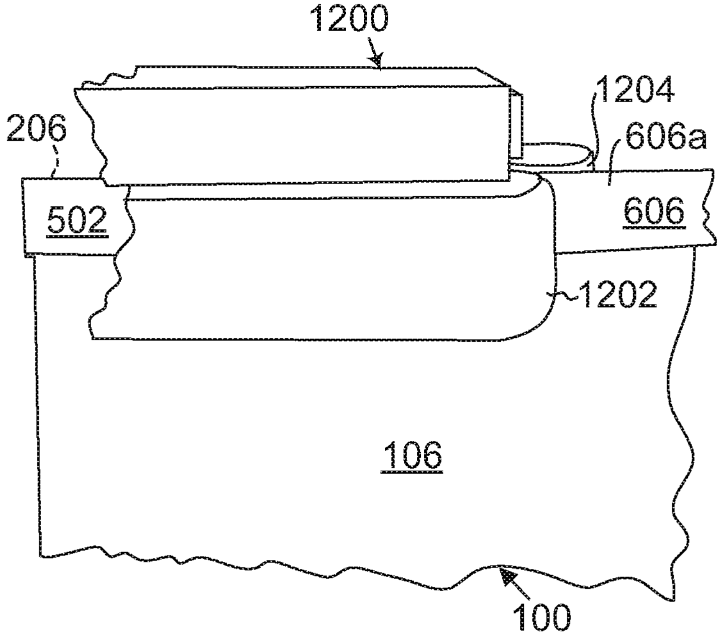
FIG. 11 is a schematic view of a pinch closing and cooling apparatus of the hot air sealer apparatus of FIG. 4.

FIG. 6 discloses the hot air manifold 700 in the hot air sealer apparatus 400. Further, FIG. 6 discloses a tapered trailing end 732 of the hot air chamber 716. The hot air chamber 716 tapers inward at 732*a* along the front wall 710, disclosed by FIGS. 8 and 11, toward the trailing end 732. The hot air chamber 716 tapers downward at 732*b*, disclosed by FIGS. 9 and 11, along the top wall 702 toward the trailing end 732. In FIG. 11, hot air is supplied to the hot air chamber 116 by way of a hot air conduit 720 connected to the inlet 718.

In FIG. 6, the bag 100 having the flap portion 502 and the panel section 202 is conveyed from right to left over the top wall 702 of the hot air chamber 716, while hot air under pressure is blown from the hot air chamber 16 through the passages 720 through the top wall 702 and onto the adhesive layer 602 on the flap portion 502 and onto the adhesive layer 600 on the panel section 202. The adhesive layers 600, 602 are heated to adhesive states by the hot air, and thereafter pass a trailing end 732 of the hot air chamber 716.

According to an embodiment of the invention, the passages 722 are added to the back wall 704 such that hot air under pressure is blown from the hot air chamber 116 through the passages 722 through the back wall 704 and onto the adhesive layer 600 disclosed by FIGS. 2 and 3, on the panel section 204 disclosed by FIG. 3. The adhesive layer 600 is heated to an adhesive state by the hot air, and thereafter passes a trailing end 732 of the hot air chamber 716. The number of passages 722 through the back wall 704 can be selected to a limited number, which limits the amount of hot air flow through the passages 722, and which limits the amount of heat applied by the hot air to the adhesive layer 600, to avoid heat damage or melting of the polymeric bag material.

The adhesive material can transfer to the hot air manifold and associated mechanisms, causing equipment contamination. To minimize equipment contamination, FIG. 9 discloses the top wall 702 is recessed below the top edge margin 726 to define a recess 730 along the top wall 702 to space the adhesive layers 600, 602 away from the top wall 702 and prevent contact therebetween while the adhesive layers 600, 602 are heated to their adhesive states. Further, the back wall 704, disclosed by FIG. 10, has lengthwise outwardly projecting edge margins 726, 728 formed by bending. The projecting edge margins 726, 728 form a lengthwise cavity 730 disclosed by FIG. 10, wherein the projecting edge margins 726, 728 space the adhesive layer 600 on the panel section 204 away from the back wall 704 to prevent contact therebetween while the adhesive layers 600, 602 are heated to their adhesive states.

Further, it would be desirable for the bags 100 to have the adhesive material of the adhesive layers 600, 602 located in positions, which will minimize transfer of adhesive material to the hot air manifold 700 and associated mechanisms. Thus, on the bag 100, the first adhesive material 600 and the second adhesive material 602 are absent from the third section 208, wherein the third section 208 between the first section 202 and the second section 204 is free of adhesive. As a result, the tube is folded and pressure is applied, without displacing or expelling adhesive from the third section 208, in order to minimize adhesive contamination of the hot air manifold 700 and associated mechanisms. Further, the third section 208 of the first panel 106 is conveyed along a section 726 of the hot air manifold 700 between the back wall 704 and the top wall 716, wherein contact between the third section 208 and the hot air manifold 700 is absent of adhesive material, which minimizes adhesive contamination.

The hot air sealer apparatus 400 is adapted for pinch closing and sealing a multi-wall paper bag, not shown, having a hot melt adhesive. The hot air manifold 700 is further capable of heating the hot melt adhesive to a hot melt temperature by adjusting the temperature at which the hot air is heated in the hot air chamber 716. The multi-wall paper bag can withstand the hot melt temperature. However, the bag 100 of polymeric material cannot withstand the hot melt temperature. Accordingly, the temperature at which the hot air is heated in the hot air chamber 116 must be adjusted below the melt temperatures or softening point temperatures of polymeric materials used in making the bag 100. The passages 722 through the back wall 704 can be selected to a limited number and size, which limits the amount of hot air flow to limit the amount of heat applied by the hot air to the adhesive layer 600. The polymeric material of the woven polymeric bag withstands the temperature of the limited amount of hot air flow through the passages 72, and thereby avoid heat damage or melting of the polymeric bag material. Further, a multi-wall paper bag 100, FIG. 1A, which has a hot melt adhesive layer of about 1.5 inches in width across the bag can be heated by hot air blown through the top wall 702. However, the multi-wall paper bag does not have additional adhesive to form an adhesive-to-adhesive seal. For this reason, hot air blown through the passages 722 through the back wall 704 of the hot air chamber 716 impinges harmlessly against the multi-wall paper bag. The paper material of the multi-wall paper bag withstands the temperature of the limited amount of hot air flow through the passages 722.

FIG. 6 discloses the folding blade 606 biases against the bag 100 to hold the flap portion 502 and the section 202 of the panel 106 downward toward the top wall 702 as the flap portion 502 and the section 202 of the panel 106 are conveyed from right to left. Further, the folding blade 606 has a trailing end 606*a* that extends beyond the trailing end 732 of the hot air chamber 716. The folding blade 606 progressively bends lengthwise toward its trailing end 606*a* until its trailing end 606*a* is essentially vertical beyond the trailing end 732 of the hot air chamber 716. The progressively bending folding blade 606 biases the flap portion 502 and the section 202 of the panel 106 progressively downward to follow the tapered top wall 732*b* of the hot air chamber 716. Beyond the trailing end 732 of the hot air chamber 716, the trailing end 606*a* of folding blade 606 biases the flap portion 502 and the section 202 of the panel 106 essentially vertical. Further, the trailing end 606*a* of the folding blade 606 biases the flap portion 502 to fold, as disclosed in FIGS. 2 and 3, along the fold line 206, FIG. 3, while the adhesive layer 600 on the panel section 202 has been heated to an adhesive state and becomes biased to engage against the heated adhesive layer 600, disclosed by FIGS. 2 and 3, on the panel section 204 of the bag 100, which has been heated to an adhesive state. The folded panel section 202 and folded flap portion 502 emerge from the trailing end 606*a* of the folding blade 606 while the bag 100 continues to be conveyed from right to left.

FIG. 11 discloses a pinch closing apparatus 1200 of the hot air sealer apparatus 400. A pair of roller driven belt drives 1202, 1204 pinch on opposite sides of the folded bag 100 to pinch close the bag 100, and further, to clamp the second panel 108 of the bag 100 against the first panel 106 of the bag and form an adhesive-to adhesive seal by contact between the first adhesive layer 600 and the second adhesive layer 602. The belt drives 1202, 1202 apply clamping pressure transferred to the adhesive layers 600 while they become cooled to ambient and form solidified, sealed states, to form an adhesive-to-adhesive seal.

In FIG. 11, the roller driven belt drives 1202, 1204 can overlap the trailing end 606*a* of the folding blade 606 to draw the folded bag 100 out from the folding blade 606. The roller driven belt drives 1202, 1204 apply continuous clamping pressure on the bag 100 as they convey the bag 100 away from the trailing end 606*a* of the folding blade 606. After leaving the belt drives 1202, 1204, the bag 100 can be clamped to continue with clamping pressure applied on the opposite sides of the folded bag 100, along the folded section 202, to apply clamping pressure against the adhesive layers 600, 602 to adhere them to each other while they become cooled to ambient and form solidified, sealed states.

An adhesive material was required to be developed to provide a first adhesive layer 600 of heat activated adhesive material on a portion of the bag 100. The same or another adhesive material was required to be developed to provide a second adhesive layer 602 of heat activated adhesive material on another portion of the bag 100, wherein heat activation temperatures of the first adhesive layer 600 and the second adhesive layer 602 are below the softening point temperature of the polymeric material of the bag 100, and wherein the adhesive layer 600 can be urged into contact with the further adhesive layer 602 and form an adhesive-to-adhesive seal to close and seal the bag 100 at its end 122. Sealing was advantageously to be performed by using existing end-user production line equipment for applying controlled temperature heat to activate the adhesive layers 600, 602 to adhesive states. A soluble adhesive was developed, wherein the adhesive layer 600 and the adhesive layer 602 comprise an adhesive material soluble in an air dryable solvent. For example, the adhesive layer 600 and the further adhesive layer 602 comprise adhesive material or materials soluble in water and air dried to dimensionally stable, non-adhesive states impervious to water or water vapor.

The adhesive layer 600 and the further adhesive layer 602 comprise respective adhesive materials having a melt temperature below 300° F., which is below the softening point temperature Tg of the polymeric materials in the layers 102, 104 of the bag 100. Further, each of the adhesive layer 600 and the further adhesive layer 602 comprise adhesive materials dried in air, at a temperature below the temperature required to activate to adhesive states.

The adhesive layers 600, 602 are activated to an adhesive state by applying heat at a heat activation temperature below the heat activation temperatures of standard or traditional hot melt adhesives or solvent based adhesives that can seal traditional paper and polymer laminated bags without damaging the paper layers, but which exceed the softening point temperature Tg of polymeric bags 100 fabricated without paper layers. The standard or traditional hot melt adhesives cannot be combined with polypropylene bags 100 because the temperatures needed to activate the adhesives are destructive to the PP material structure.

Embodiments of the adhesive layers 600, 602 comprise, an aqueous dispersion of an adhesive material or a water based adhesive materials applied in liquid form and air dried or cured to a stable, non-adhesive state when air dried to ambient temperature. Further embodiments of the adhesive layers 600, 602 each are an acrylic based waterborne adhesive or a polyurethane dispersion adhesive, or a butyl, synthetic or natural rubber adhesive. Other embodiments of the adhesive layers 600, 602 include a polyurethane adhesive dispersed in water (PUD). A preferred embodiment is made up of 35 percent solids. It is applied at 1.75 grams/bag wet, assuming an 18" wide bag, across the 3" sealing area. The viscosity is adjusted to correspond with the mass flow rate of the preferred embodiments of an applicator apparatus and method, for example, a slot die applicator applying a stripe of the adhesive layers each of a viscosity of 800-1000 centipoises and a coating weight sufficient to form an adhesive-to-adhesive seal that will withstand bag tests to be described herein.

An embodiment of the adhesive layers 600, 602 for pinch sealing of PP woven bags 100 is comprised of synthetic polymer or co-polymer emulsions that are water- or solvent-based, including without limitation polyurethane dispersion adhesives, vinyls, acrylics, or other polymer or co-polymer emulsions, or may include natural or synthetic rubber-based adhesives, which are applied wet solubilized and then dried to a hardened state impervious to water and water vapor. Known application apparatus to use on a production line includes, but is not limited to spray applicators, wheels, or a slot die applicators. The adhesive layers 600, 602 form an adhesive-to-adhesive seal when activated to adhesive states by heat applied by a hot air jet or other thermal source at an elevated temperature up to about and less than about 300 degrees F. which is below the melting point temperature of the polymeric, polyolefin films and/or PP woven materials of the bag panels 106, 108 and the bag gussets 110 when present. Such adhesive layers 600, 602 provide adequate bond and adhesion to polyolefin films and/or PP woven materials, are FDA approved for non-direct food contact, and provide adequate sheer, peel and bond strengths to meet bag testing parameters to be described herein.

Two adhesive layers 600, 602 in particular are an acrylic based waterborne adhesive and a polyurethane dispersion adhesive. Each has an adhesive state activation temperature below 300° F., and below the softening point temperature Tg of the polymeric layers 102, 104 made of compostable polypropylene, for example.

An embodiment of the adhesive layers 600, 602 includes: a polyurethane adhesive dispersion of 35% solids in water, with a viscosity adjusted for application to the bags, for example, a viscosity of approximately or about 800-1000 centipoises for application by a slot die applicator, or less than about 800 centipoises for application by a spray applicator. The viscosity is varied or adjusted to obtain an optimum mass flow rate and attain a desired coating weight as need for application by a specific form of applicator. Adhesive 1623-63A, is available commercially from Bostik, Inc., Wauwatosa, Wis. 53226, USA, wherein the adhesives per se form no part of the present invention separate from being a structural component of the bags disclosed herein. The embodiments of adhesive layers 660, 602 as a structural component of the bags includes 1.75 grams adhesive material per bag applied wet, solubilized in water, assuming an 18 inch wide bag and a 3 inches wide stripe of adhesive on the bag, which is equivalent to 0.6 grams per bag dry or about 10.6 lbs per ream dry weight coating. Once the adhesive layers 600, 602 are applied, they must pass under a drying system to evaporate the water and dry the adhesive layers to a stable state impervious to water, water vapor and ambient temperatures.

The bag 100 includes heat sealable material or materials on a low melt temperature, woven and solid polyolefin films. The suitable adhesive material or materials are applied to the bag surfaces as a solution or emulsion, and are air dried at temperatures below their heat activation temperatures to evaporate the volatiles of solvent or water and solidify. The solid adhesive materials are not moisture or pressure sensitive to activate to an adhesive state, and thereby avoid contamination of the bag contents during bag filling.

One suitable adhesive material for heat sealing polyolefin films of the bag 100 comprises a water based emulsion of triethylamine adhesive commercially available as AQUA-GRIP® 19566F, manufactured by Bostik, Inc., 11320 Watertown Plank Road, Wauwatosa, Wis. 53226 USA.

Another embodiment of a hot melt adhesive for heat sealing polyolefin films of the bag 100 comprises a hot melt adhesive H9463 available commercially from Bostik, Inc. Wauwatosa, Wis. 53226, USA, wherein the adhesives per se form no part of the present invention separate from being a structural component of the bags disclosed herein. The hot melt adhesive H9463 has a softening point temperature of 148° C. (298° F.), a liquid flow temperature of 177° C. (350° F.) and a viscosity of 18000 centipoise at 162.8° C. (325° F.) and 900 centipoise at 190.6° C. (375° F.).

Another embodiment of a hot melt adhesive for heat sealing polyolefin films of the bag 100 comprises a hot melt adhesive H9477 Generation II of H9463 now or soon to be available commercially from Bostik, Inc. Wauwatosa, Wis. 53226, USA, wherein the adhesives per se form no part of the present invention separate from being a structural component of the bags disclosed herein.

Another embodiment of a suitable adhesive material for heat sealing polyolefin films of the bag 100 comprises an aqueous based dispersion or emulsion as an opaque liquid or fluid of an ethylene copolymer or ethylene copolymers, butyl acetate and acetaldehyde, which is commercially available as the product name ROBOND™ HS 37-140 adhesive material manufactured by Rohm and Haas Company, 100 Independence Mall West, Philadelphia, Pa. 19106-2399 USA, wherein the adhesives per se form no part of the present invention separate from being a structural component of the bags disclosed herein.

Another embodiment of a suitable adhesive material for heat sealing polyolefin films of the bag 100 comprises an aqueous based dispersion or emulsion as an opaque liquid or fluid, including an ionomer dispersion in water, based upon Surlyn® ionomer resin, and which can be diluted or thickened or crosslinked for enhanced properties, and which is commercially available as the product name ADCOTE™ 37-220 Heat Seal Coating manufactured by Rohm and Haas Company, 100 Independence Mall West, Philadelphia, Pa. 19106-2399 USA, which during oven drying must reach a minimum temperature of 82° C. (180° F.) and which must reach a minimum heat seal temperature 93° C. (250° F.), wherein the adhesives per se form no part of the present invention separate from being a structural component of the bags disclosed herein.

Another embodiment of a suitable adhesive material for heat sealing polyolefin films of the bag 100 comprises an aqueous based dispersion or emulsion as an opaque liquid or fluid, including water, acrylic polymer, polyester polyurethane resin, formaldehyde, ammonium hydroxide, alumina and further including ammonia as a combustion product, which is commercially available as the product name NWC 23526K (and NWC 23526KC) FDA WATER BASE HEAT SEAL FOR POLYWOVEN™ adhesive material, product code 728575, manufactured by ASHLAND Inc., P.O. Box 2219, Columbus, Ohio 43216, USA, wherein the adhesives per se form no part of the present invention separate from being a structural component of the bags disclosed herein.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An apparatus adapted for sealing bags selected from the group consisting of woven polymeric bags and multi-wall paper bags, comprising:

a hot air manifold along which a bag is conveyed after the bag has been filled with contents and then closed;

a hot air chamber of the manifold;

the hot air chamber having first air passages, extending through a back wall of the chamber, to transmit hot air under pressure to heat at least a portion of a first adhesive layer on the bag to an adhesive state, and having second air passages, extending through a top wall of the chamber, to transmit hot air under pressure to heat a second adhesive layer on the bag to an adhesive state;

the apparatus being adapted for sealing woven polymeric bags with the adhesive layers heated to adhesive states by the hot air of a reduced amount, wherein a hot air deflector covers selected said second air passages, reducing the number of second air passages for transmitting hot air of a reduced amount; and the apparatus being adapted for sealing a multi-wall paper bag requiring hot air of an increased amount for heating a corresponding adhesive layer to an adhesive state, wherein said hot air deflector is moveable and mounted to a position uncovering the selected said second air passages to increase the number of second air passages for transmitting hot air of an increased amount for heating a corresponding adhesive layer to an adhesive state, wherein fasteners attach the hot air deflector to the manifold, and the fasteners loosen for the deflector to move and uncover the selected second air passages to increase the amount of hot air under pressure through the top wall for heating a corresponding adhesive layer on a multi-wall paper bag.

2. The apparatus as recited in claim 1, comprising:

the hot air deflector in a first position covering the selected second air passages; and the hot air deflector in a second position having openings respectively aligned with the selected second air passages.

3. The apparatus as recited in claim 2 wherein the hot air deflector is movable from the first position to the second position to uncover the selected second air passages, which increases the amount of hot air under pressure through the top wall for heating a corresponding adhesive layer on a multi-wall paper bag.

4. The apparatus as recited in claim 2 wherein the hot air deflector is slidable on the hot air chamber to a first position covering less than all of the air passages, and the hot air deflector is slidable to a second position on the hot air chamber, and uncovering the selected second air passages to increase the amount of hot air under pressure through the top wall for heating a corresponding adhesive layer on a multi-wall paper bag.

5. The apparatus as recited in claim 1 wherein the hot air deflector covers less than all of the air passages through the top wall with the hot air deflector in a first position; and the hot air deflector uncovers said less than all of the air passages with the hot air deflector in a second position, wherein the hot air deflector has multiple openings aligned respectively with said less than all of the air passages to increase the amount of hot air under pressure through the top wall for heating a corresponding adhesive layer on a multi-wall paper bag.

6. The apparatus as recited in claim 1, comprising:

fasteners extending through an elongated slot in the hot air deflector to secure the hot air deflector to the manifold, wherein the fasteners loosen for the slot to move with the deflector and for the deflector to move to a position uncovering the selected second air passages to increase the amount of hot air under pressure through the top wall for heating a corresponding adhesive layer on a multi-wall paper bag, and wherein the fasteners tighten to secure the hot air deflector to the manifold.

7. The apparatus as recited in claim 1, wherein the hot air chamber comprises individual pieces welded or brazed together to form the top wall, the back wall, a bottom wall, a front wall and end walls.

8. The apparatus as recited in claim 7, wherein the hot air chamber comprises individual pieces, which are stamped and formed, wherein the individual pieces are welded or brazed together to form the top wall, the back wall, the bottom wall, the front wall and end walls.

9. The apparatus as recited in claim 3, wherein the back wall bends outwardly to provide the projecting edge margins.

10. Apparatus for adapting hot air sealer equipment for sealing woven polymeric bags and multi-wall paper bags, comprising:

a hollow, hot air manifold to distribute hot air where it is needed to heat first and second adhesive layers to their adhesive states on each woven polymeric bag, wherein the adhesive layers in the adhesive states seal the bag upon the bag being folded to contact the adhesive layers with each other and form an adhesive to adhesive seal;

the hot air manifold having a hot air chamber enclosed by respective walls, and an inlet for supplying hot air under pressure to the hot air chamber;

a respective back wall on the hot air chamber, and air passages through the back wall to blow hot air under pressure to heat at least part of the first adhesive layer on the bag to an adhesive state, outwardly projecting edge margins on the back wall to space the first adhesive away from contact with the back wall while at least the portion of the first adhesive layer is heated to an adhesive state by the hot air under pressure;

a respective top wall on the hot air chamber having further air passages through the top wall for blowing hot air under pressure to heat the second adhesive layer on the bag to an adhesive state;

the top wall being recessed below a top edge margin on the top wall to define a recess, which spaces one or both of the adhesive layers on the bag away from contact with the top wall while the adhesive layers are heated to adhesive states by the hot air under pressure;

the hot air chamber having a trailing end beyond which the adhesive layers extend to contact each other and form the adhesive to adhesive seal;

the corresponding further air passages being uncovered to increase the amount of hot air under pressure through the top wall for heating a corresponding adhesive layer on a multiwall paper bag; and a hot air deflector covering corresponding further air passages, wherein the corresponding further air passages being covered by the hot air deflector reduce the amount of hot air under pressure through the top wall for heating the second adhesive layer on the woven polymeric bag.

11. Apparatus for heating first and second adhesive layers to their adhesive states on a bag, wherein the adhesive layers in their adhesive states seal the bag upon the bag being folded to contact the adhesive layers with each other and form an adhesive to adhesive seal, the apparatus comprising:

a hollow, hot air manifold having a hot air chamber and an inlet for supplying hot air under pressure to the hot air chamber;

first air passages through a first portion of the hot air chamber to transmit hot air under pressure to heat at least a portion of the first adhesive layer on the bag to an adhesive state;

second air passages through a second portion of the hot air chamber to transmit hot air under pressure to heat the second adhesive layer on the bag to an adhesive state;

the hot air chamber having an end wall at a trailing end beyond which the adhesive layers extend to contact each other and form the adhesive to adhesive seal upon the bag being folded; and a hot air deflector covering selected said second air passages to reduce an amount of hot air heating at least a portion of the second adhesive layer on the bag to an adhesive state, said hot air deflector being moveably mounted on the manifold to a position uncovering the selected said second air passages to increase the amount of hot air, fasteners extending through an elongated slot in the hot air deflector and fastened to the manifold, wherein the fasteners loosen for the slot to move with the deflector and for the deflector to move and uncover the selected second air passages to increase the amount of hot air under pressure through a top wall for heating a corresponding adhesive layer, and wherein the fasteners tighten to secure the hot air deflector in position.

12. The apparatus of claim 11, wherein the hot air chamber comprises individual pieces welded or brazed together to form the top wall, a back wall, a bottom wall, a front wall and end walls.

13. The apparatus of claim 11, wherein the hot air chamber comprises individual pieces, which are stamped and formed, wherein the individual pieces are welded or brazed together to form the top wall, a back wall, a bottom wall, a front wall and end walls.

* * * * *